(12) United States Patent
Ge et al.

(10) Patent No.: US 10,974,450 B2
(45) Date of Patent: Apr. 13, 2021

(54) 3D PRINTER WITH TUNED FUSING RADIATION EMISSION

(71) Applicant: Hewlett-Packard Development Company, L.P., Houston, TX (US)

(72) Inventors: Ning Ge, Palo Alto, CA (US); Paul J. Benning, Corvallis, OR (US); Lihua Zhao, Sunnyvale, CA (US); Steven J. Simske, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 289 days.

(21) Appl. No.: 16/072,247

(22) PCT Filed: May 17, 2016

(86) PCT No.: PCT/US2016/032886
§ 371 (c)(1),
(2) Date: Jul. 24, 2018

(87) PCT Pub. No.: WO2017/200534
PCT Pub. Date: Nov. 23, 2017

(65) Prior Publication Data
US 2019/0030798 A1    Jan. 31, 2019

(51) Int. Cl.
*B29C 64/165* (2017.01)
*B29C 64/393* (2017.01)
(Continued)

(52) U.S. Cl.
CPC .......... *B29C 64/165* (2017.08); *B29C 64/282* (2017.08); *B29C 64/393* (2017.08);
(Continued)

(58) Field of Classification Search
CPC .......................... B29C 64/165; B29C 64/282
(Continued)

(56) References Cited

U.S. PATENT DOCUMENTS

| 5,340,656 A | 8/1994 | Sachs et al. |
| 2005/0208168 A1* | 9/2005 | Hickerson ............. B29C 64/214 425/174.4 |

(Continued)

FOREIGN PATENT DOCUMENTS

| CN | 104640686 | 3/2015 |
| EP | 2918359 | 9/2015 |

(Continued)

OTHER PUBLICATIONS

Grunewald, S.J. "Graphene 3D Lab Files Patent for Graphene 3D Printed LED Light Source and Multi-Function 3D Printer", Dec. 4, 2015; http://3dprint.com/109090/graphene-3d-patent-led-light/.

(Continued)

*Primary Examiner* — Robert A Cassity
(74) *Attorney, Agent, or Firm* — Mannava & Kang

(57) ABSTRACT

According to an example, a three-dimensional (3D) printer may include a first delivery device to selectively deposit first liquid droplets onto a layer of build materials, in which the first liquid has a fusing radiation absorption property. The 3D printer may also include a fusing radiation generator to selectively emit fusing radiation at multiple ranges of wavelengths and at selected locations to selectively fuse the build materials and a controller to tune a range of wavelengths at which the fusing radiation generator is to emit fusing radiation based upon the fusing radiation absorbing property of the deposited first liquid, to determine the selected locations at which the fusing radiation at the tuned range of wavelengths is to be emitted, and to control the fusing radiation generator to selectively emit fusing radiation at the tuned range of wavelengths and onto the selected locations.

15 Claims, 6 Drawing Sheets

(51) Int. Cl.
*B29C 64/282* (2017.01)
*B33Y 30/00* (2015.01)
*B33Y 50/02* (2015.01)
*B33Y 10/00* (2015.01)
*B29C 64/295* (2017.01)

(52) U.S. Cl.
CPC ............. *B29C 64/295* (2017.08); *B33Y 10/00* (2014.12); *B33Y 30/00* (2014.12); *B33Y 50/02* (2014.12)

(58) Field of Classification Search
USPC .......................................................... 700/98
See application file for complete search history.

(56) References Cited

U.S. PATENT DOCUMENTS

| 2007/0241482 | A1* | 10/2007 | Giller | G03G 15/224 264/494 |
| 2008/0122141 | A1* | 5/2008 | Bedal | C08J 5/00 264/405 |
| 2009/0091593 | A1 | 4/2009 | Sakurai | |
| 2010/0104332 | A1 | 4/2010 | Law et al. | |
| 2015/0142159 | A1 | 5/2015 | Chang | |
| 2015/0273769 | A1 | 10/2015 | Korn | |
| 2016/0279707 | A1* | 9/2016 | Mattes | B29C 64/268 |
| 2017/0015065 | A1* | 1/2017 | Potter | B29C 64/393 |
| 2017/0157849 | A1* | 6/2017 | Mook | B22F 3/1055 |

FOREIGN PATENT DOCUMENTS

| EP | 2918359 A1 * | 9/2015 | ............ B22F 3/1055 |
| WO | WO-2007114895 | 10/2007 | |
| WO | WO-2015113408 | 8/2015 | |
| WO | WO-2016048348 A1 | 3/2016 | |

OTHER PUBLICATIONS

Harrison, T. "The Rapid Growth of Rapid Prototyping", May 1, 2015; http://www.institution-engineering-designers.org.uk/Article/Features/the-rapid-growth-of-rapid-prototyping.

* cited by examiner

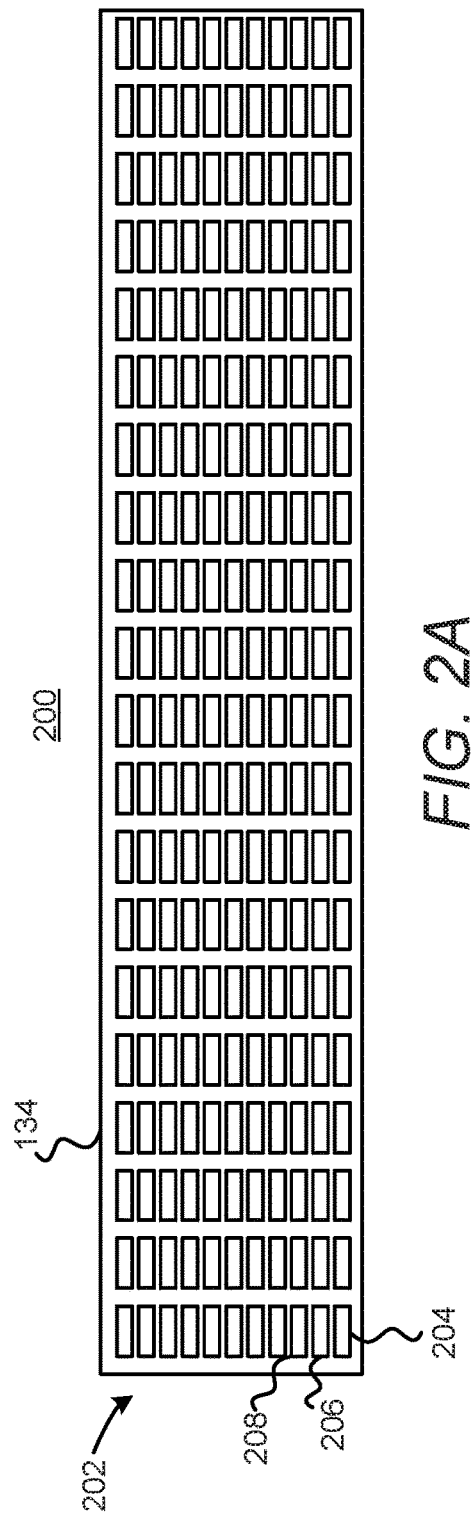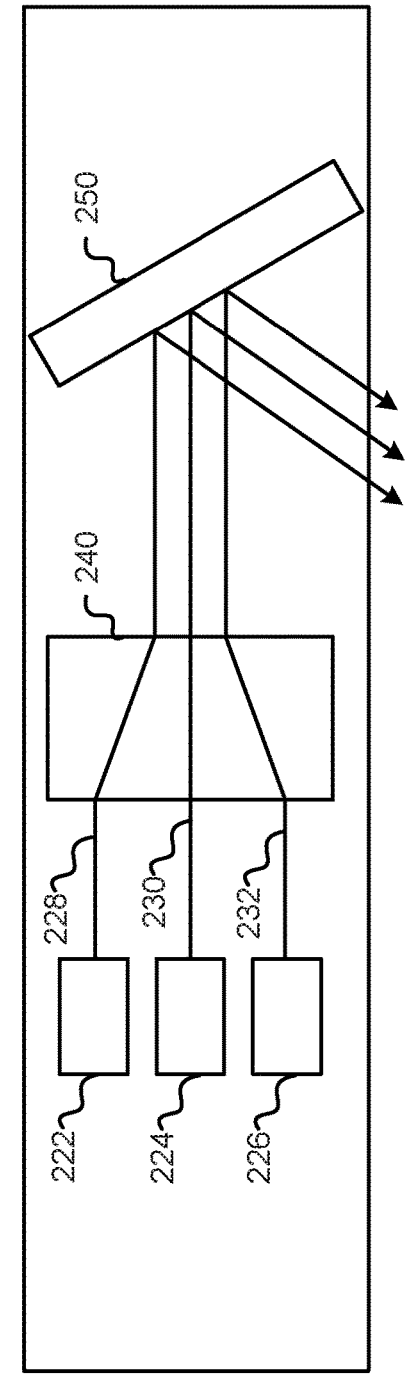

3D PRINTER WITH TUNED FUSING RADIATION EMISSION

BACKGROUND

In three-dimensional (3D) printing, an additive printing process is often used to make three-dimensional solid parts from a digital model. 3D printing is often used in rapid product prototyping, mold generation, mold master generation, and short-run manufacturing. Some 3D printing techniques are considered additive processes because they involve the application of successive layers of material to an existing surface (template or previous layer). This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of the present disclosure are illustrated by way of example and not limited in the following figure(s), in which like numerals indicate like elements, in which:

FIGS. 2A and 2B, respectively, show simplified block diagrams of example fusing radiation generators;

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are a 3D printer, methods for implementing the 3D printer to form a 3D part, and a management apparatus for controlling operations of the 3D printer. The 3D printer disclosed herein may include a first delivery device to selectively deposit first liquid droplets onto a layer of build materials. The 3D printer may also include a controller to tune a range of wavelengths at which a fusing radiation generator is to emit fusing radiation onto the layer, in which the range of wavelengths may be tuned (or equivalently, chosen) based upon a fusing radiation absorbing property of the first liquid. For instance, the controller may tune the range of wavelengths to be a range of wavelengths that results in a maximized interaction between the fusing radiation and the first liquid. In another example, the controller may tune the range of wavelengths to be a range of wavelengths that results in a minimized interaction between the fusing radiation and the first liquid.

The controller may also determine selected locations of the layer at which the fusing radiation is to be applied and may control the fusing radiation generator to selectively emit fusing radiation at the tuned range of wavelengths onto the selected locations. In other words, the controller may cause localized application of the fusing radiation onto areas of the build material layer at which fusing of the build materials is to occur.

Through implementation of the 3D printer and methods disclosed herein, fusing radiation may be delivered onto build materials in a relatively efficient manner. That is, for instance, the 3D printer disclosed herein may enable the time required and/or the amount of fusing radiation required to selectively fuse the build materials together to be minimized substantially.

Figure 1A:
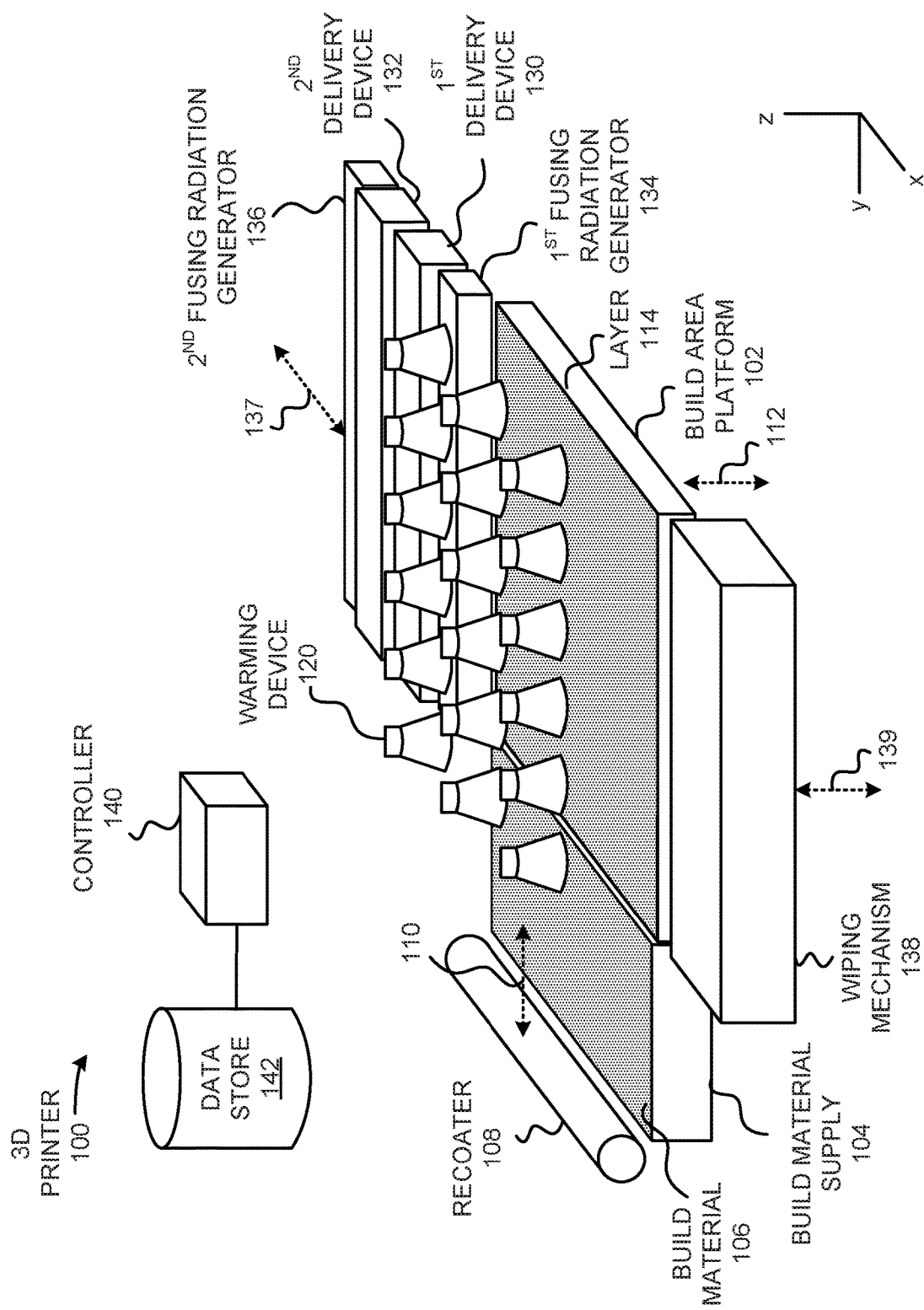
FIG. 1A shows a simplified isometric view of an example three-dimensional (3D) printer for generating, building, or printing three-dimensional parts.

With reference first to FIG. 1A, there is shown a simplified isometric view of an example three-dimensional (3D) printer 100 for generating, building, or printing three-dimensional parts. It should be understood that the 3D printer 100 depicted in FIG. 1A may include additional components and that some of the components described herein may be removed and/or modified without departing from a scope of the 3D printer 100 disclosed herein.

The 3D printer 100 is depicted as including a build area platform 102, a build material supply 104 containing build materials 106, and a recoater 108. The build material supply 104 may be a container or surface that is used to position build materials 106 between the recoater 108 and the build area platform 102. The build material supply 104 may be a hopper or a surface upon which the build materials 106 may be supplied, for instance, from a build material source (not shown) located above the build material supply 104. Additionally, or alternatively, the build material supply 104 may include a mechanism to provide, e.g., move, the build materials 106 from a storage location to a position to be spread onto the build area platform 102 or a previously formed layer of build materials 106. For instance, the build material supply 104 may include a hopper, an auger conveyer, or the like. Generally speaking, 3D objects or parts are to be generated from the build materials 106 and the build materials 106 may be formed of any suitable material including, but not limited to, polymers, metals, and ceramics. In addition, the build materials 106 may be in the form of a powder.

The recoater 108 may move in a direction as denoted by the arrow 110, e.g., along the y-axis, over the build material supply 104 and across the build area platform 102 to spread a layer 114 of the build materials 106 over a surface of the build area platform 102. The layer 114 may be formed to a substantially uniform thickness across the build area platform 102. In an example, the thickness of the layer 114 may range from about 90 μm to about 110 μm, although thinner or thicker layers may also be used. For example, the thickness of the layer 114 may range from about 20 μm to about 200 μm, or from about 50 μm to about 200 μm. The recoater 108 may also be returned to a position adjacent the build material supply 104 following the spreading of the build materials 106. The recoater 108 may be a doctor blade, roller, a counter rotating roller or any other device suitable for spreading the build materials 106 over the build area platform 102.

The 3D printer 100 is also depicted as including a plurality of warming devices 120 arranged in an array above the build area platform 102. Each of the warming devices 120 may be a lamp or other heat source that is used to apply heat onto spread layers of the build materials 106, for instance, to maintain the build materials 106 at or above a predetermined threshold temperature. According to an example, the warming devices 120 may maintain the temperatures of the build materials 106 at a relatively high temperature that facilitates the fusing of the build materials 106 at selected locations, e.g., the build materials 106 upon which a particular liquid, such as a fusing agent, has been mixed or applied.

The 3D printer 100 is further depicted as including a first delivery device 130 and a second delivery device 132, which may both be scanned across the build area platform 102 in both of the directions indicated by the arrow 137, e.g., along the x-axis. The first delivery device 130 and the second delivery device 132 may be, for instance, thermal inkjet printheads, piezoelectric printheads, or the like, and may extend a width of the build area platform 102. Although the first delivery device 130 and the second delivery device 132 have each been depicted in FIG. 1A as being formed of a single device, it should be understood that each of the first delivery device 130 and the second delivery device 132 may include multiple printheads that span the width, e.g., along the y-axis, of the build area platform 102.

In other examples in which the first delivery device 130 and the second delivery device 132 do not extend the width of the build area platform 102, the first delivery device 130 and the second delivery device 132 may also be scanned along the y-axis to thus enable the first delivery device 130 and the second delivery device 132 to be positioned over a majority of the area above the build area platform 102. The first delivery device 130 and the second delivery device 132 may thus be attached to a moving XY stage or a translational carriage (neither of which is shown) that is used to move the first delivery device 130 and the second delivery device 132 adjacent to the build area platform 102 in order to deposit respective liquid droplets in predetermined areas of a layer 114 of the build materials 106.

Although not shown, the first delivery device 130 and the second delivery device 132 may each include a plurality of nozzles through which the respective liquid droplets are to be ejected onto the build material layer. According to an example, the liquids may have different fusing radiation absorbing properties with respect to each other, i.e., salient fusing radiation absorbing properties (fusing radiation absorbing properties that are tied to the range of wavelengths described herein). For instance, the first delivery device 130 may eject liquid droplets having a lower fusing radiation absorbing rate as compared the liquid droplets ejected by the second delivery device 132. By way of particular example, either or both of the liquids to be ejected by the first delivery device 130 and the second delivery device 132 may be deposited onto areas of the build material layer 114 that are to be fused together. In another example, either or both of the liquids may be deposited onto areas of the build material layer 114 that are not to be fused together.

In other examples, the first delivery device 130 may deposit multiple liquids having different fusing radiation absorbing properties; for instance, the multiple liquids may have different fusing radiation absorption rates with respect to each other. By way of example, the multiple liquids may have different colors with respect to each other, may have different chemical compositions (e.g., different reactants and/or catalysts) with respect to each other, or the like. In the example in which the first delivery device 130 deposits multiple liquids, the first delivery device 130 may include multiple printheads, in which the multiple printheads may deposit liquids having a different energy absorption property with respect to the other fusing agents. The second delivery device 130 may also deposit multiple liquids having different fusing radiation absorption properties.

By way of example, the first and the second delivery devices 130, 132 may each include a printhead or multiple printheads available from HP Inc. of Palo Alto, Calif.

Following deposition of a first liquid from the first delivery device 130 and/or a second liquid from the second delivery device 132 onto selected areas of the layer 114 of the build materials 106, a first radiation generator 134 and/or a second radiation generator 136 may be implemented to apply fusing radiation onto the layer of build materials 106. The fusing radiation may be in the form of light, electromagnetic radiation, microwaves, or the like. Particularly, for instance, the fusing radiation generator(s) 134, 136 may be activated and moved across the layer 114 of build materials 106, for instance, along the directions indicated by the arrow 137, to apply fusing radiation in the form of light and/or heat onto the build materials 106. Examples of the first and second radiation generators 134, 136 may include a UV, IR or near-IR curing lamp, IR or near-IR light emitting diodes (LED), halogen lamps emitting in the visible and near-IR range, microwaves, or lasers with desirable electromagnetic wavelengths. The types of fusing radiation generators 134, 136 may depend, at least in part, on the type of active material used in the liquids applied onto the layer 114 of build materials 106. According to an example, the first delivery device 130, the second delivery device 132, the first fusing radiation generator 134, and the second fusing radiation generator 136 may be supported on a carriage (not shown) that may be scanned over the build area platform 102 in the directions denoted by the arrow 137.

According to an example, the fusing radiation generator 134 and/or the second radiation generator 136 may selectively emit fusing radiation at a range of wavelengths and at selected locations on the build material layer 114. In addition, the fusing radiation generator 134 and/or the second radiation generator 136 may be controlled to selectively emit fusing radiation at a chosen range of wavelengths, in which the chosen range of wavelengths is chosen based upon the fusing radiation absorbing properties of the deposited liquid. For instance, the range of wavelengths of the fusing radiation emitted by the first fusing radiation generator 134 and/or the second radiation generator 136 may be tuned to the fusing radiation absorbing property of the deposited liquid. By way of particular example, the range of wavelengths of the fusing radiation may be chosen to be a range of wavelengths at which absorption of the fusing radiation by the deposited liquid is enhanced.

The first fusing radiation generator 134 and/or the second radiation generator 136 may also be controlled to direct the fusing radiation onto the selected locations of the build material layer 114. Thus, for instance, the fusing radiation generator 134 and/or the second radiation generator 136 may provide focused or localized beams of fusing radiation onto the selected locations. In this regard, the fusing radiation generator 134 and/or the second radiation generator 136 may concentrate the fusing radiation beams that are tuned to the fusing radiation absorbing properties of the liquid to those build materials 106 in the selected locations on which the liquid has been deposited to thus focalize the locations at which fusing of the build materials 106 occur.

Following application of the fusing radiation to fuse selected sections of the build materials 106 together, the build area platform 102 may be lowered as denoted by the arrow 112, e.g., along the z-axis. In addition, the recoater 108 may be moved across the build area platform 102 to form a new layer of build materials 106 on top of the previously formed layer. Moreover, the first delivery device 130 may deposit a first liquid or multiple liquids and the second delivery device 132 may also deposit a second liquid or multiple liquids onto respective selected areas of the new layer of build materials 106. The above-described process may be repeated until a predetermined number of layers have been formed to fabricate a desired 3D part.

Additionally, following a liquid deposition operation across a build material layer or following multiple liquid deposition operations across multiple build material layers, the first delivery device 130 and the second delivery device 132 may be positioned adjacent to a wiping mechanism 138. The wiping mechanism 138 may wipe the nozzles of the first delivery device 130 and the second delivery device 132, as well as the nozzles of additional delivery devices if included in the 3D printer 100. The wiping mechanism 138 may be moved to a position in which a surface, such as a cleaning web (not shown), of the wiping mechanism 138 is in contact with the exterior surfaces of the nozzles. The wiping mechanism 138 may be moved in the z-direction as noted by the arrow 139 to remove debris such as, build materials 106, liquid, dust, etc., that may be in contact with the exterior surfaces of the first delivery device 130 and the second delivery device 132, to maintain the delivery devices 130, 132 at desired performance levels.

As further shown in FIG. 1A, the 3D printer 100 may include a controller 140 that may control operations of the build area platform 102, the build material supply 104, the recoater 108, the warming devices 120, the first delivery device 130, the second delivery device 132, the fusing radiation generators 134, 136, and the wiping mechanism 138. Particularly, for instance, the controller 140 may control actuators (not shown) to control various operations of the 3D printer 100 components. The controller 140 may be a computing device, a semiconductor-based microprocessor, a central processing unit (CPU), an application specific integrated circuit (ASIC), and/or other hardware device. Although not shown, the controller 140 may be connected to the 3D printer 100 components via communication lines.

The controller 140 is also depicted as being in communication with a data store 150. The data store 150 may include data pertaining to a 3D part to be printed by the 3D printer 100. For instance, the data may include the locations in each build material layer 114 that the first delivery device 130 is to deposit a first liquid and that the second delivery device 132 is to deposit a second liquid to form the 3D part. In one example, the controller 140 may use the data to control the locations on each of the build material layers 114 that the first delivery device 130 and the second delivery device 132 respectively deposit the liquids.

Figure 1B:
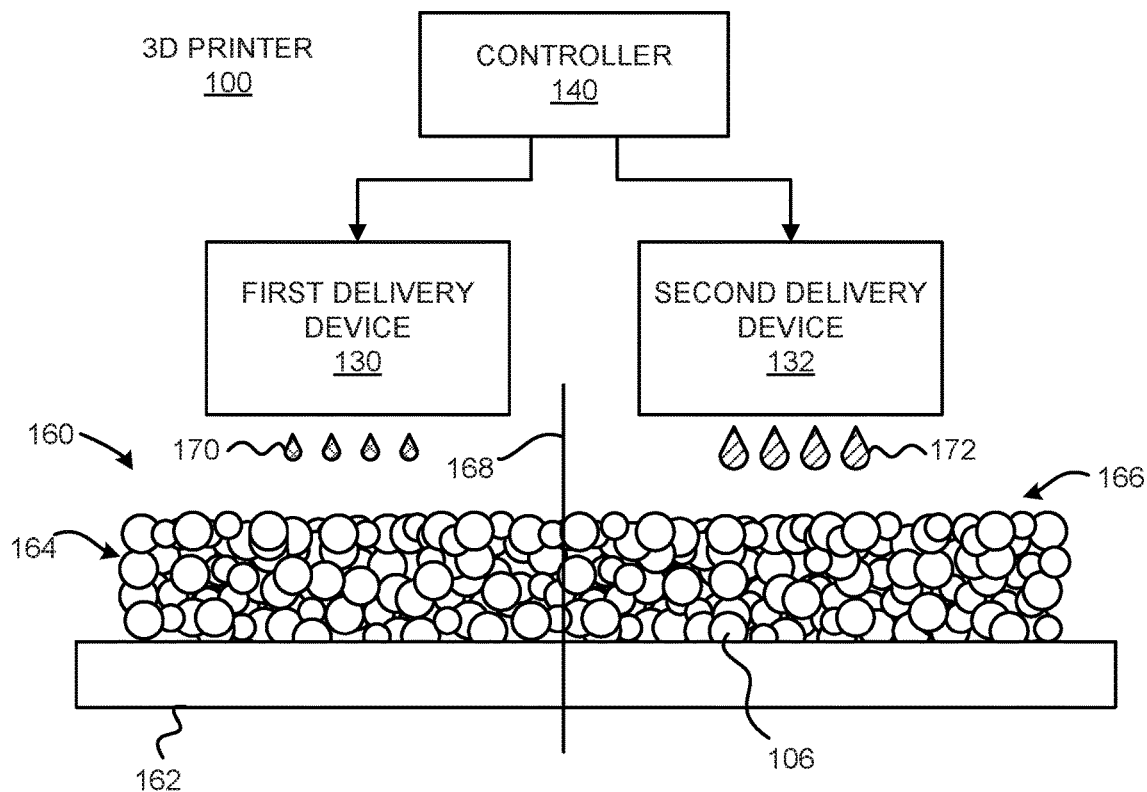
FIG. 1B shows a simplified block diagram of a few components of the example 3D printer depicted in FIG. 1A.

With reference now to FIG. 1B, there is shown a simplified block diagram of a few components of the example 3D printer 100 depicted in FIG. 1A. Particularly, the controller 140, the first delivery device 130, and the second delivery device 132 of the 3D printer 100 are shown in FIG. 1B. In addition, a layer 160 of the build materials 106 is depicted as being provided on a surface 162, which may generally represent a previously spread layer of build materials 106 or the build area platform 102. As shown, the controller 140 may control the first delivery device 130 to deposit first liquid droplets 170 onto the build materials 106 in a first section 164 of the build material layer 160. In addition, the controller 140 may control the second delivery device 132 to deposit second liquid droplets 172 onto the build materials 106 in a second section 166 of the build material layer 160. The first section 164 of the build material layer 160 may be distinguished from the second section 166 of the build material layer 160 by the virtual line 168 depicted in FIG. 1B.

According to an example, the first delivery device 130 may be scanned over the build material layer 160 and may be controlled to deposit the first liquid droplets 170 onto selected areas of the layer 160, including the first section 164 shown in FIG. 1B. That is, the controller 140 may control the first delivery device 130 to deposit the first liquid droplets 170 onto the build materials 106 that are to be fused together. Likewise, the second delivery device 132 may be scanned over the build material layer 160 and may be controlled to deposit the second liquid droplets 172 onto selected areas of the layer 160, including the second section 166 shown in FIG. 1B. That is, the controller 140 may control the second delivery device 132 to deposit the second liquid droplets 172 onto the build materials 106 that are positioned adjacent to the build materials 106 in the first section 164. As discussed above, the first and second liquids may have different fusing radiation absorbing rates at salient ranges of wavelengths with respect to each other.

In examples in which the first delivery device 130 and the second delivery device 132 are supported on a common platform or carriage, the first delivery device 130 may be controlled to deposit the first liquid droplets 170 during a first pass across the layer 160 and the second delivery device 132 may be controlled to deposit the second liquid droplets 172 during a second pass across the layer 160. For instance, the first delivery device 130 may deposit the first liquid droplets 170 as the platform or carriage is scanned in a first direction across the layer 160 and the second delivery device 132 may deposit the second liquid droplets 172 as the platform or carriage is scanned in a second direction across the layer 160. In other examples, however, the first delivery device 130 and the second delivery device 132 may be controlled to respectively deposit the first liquid droplets 170 and the second liquid droplets 172 during a common pass across the layer 160.

The amount of fusing radiation required to fuse the build materials 106 in the first section 164 together and the build materials 106 in the second section 166 together may depend on the fusing radiation absorbing properties, e.g., light absorption rates, heat absorption rates, etc., of the first liquid and the second liquid applied to the build materials 106. By way of example, the fusing radiation absorbing properties may vary depending upon the colors of the first and second liquids. For instance, darker colored liquids, such as black inks, may have higher energy absorption rates than lighter colored liquids, such as yellow or cyan inks. In another example, the fusing radiation absorbing properties may vary depending upon the chemical compositions of the first and second liquids. For instance, the first liquid may have a particular additive or catalyst that may cause the first liquid to have a higher fusing radiation absorbing rate than the second liquid, which may not have the particular additive or catalyst or has a different additive or catalyst.

The first liquid and the second liquid may each include a heat- or radiation-absorbing agent (i.e., an active material). The active material may be any suitable material that absorbs heat and/or electromagnetic radiation. The active material may be selected to absorb heat and/or any wavelength in the electromagnetic spectrum. As examples, the electromagnetic radiation absorber may absorb IR radiation (i.e., a wavelength of about 700 nm to about 1 mm, which includes near-IR radiation (i.e., a wavelength of 700 nm to 1.4 µm)), ultraviolet radiation (i.e., a wavelength of about 10 nm to about 390 nm), visible radiation (i.e., a wavelength from about 390 nm to about 700 nm), microwave radiation (i.e., a wavelength of about 1 mm to 1 about m), radio radiation (i.e., a wavelength from about 1 m to about 1000 m), or a combination thereof. An example of the active material may be a microwave radiation-absorbing susceptor, such as carbon black, graphite, magnetite, and/or various iron oxides. Carbon black may also be used as an IR (including near-IR) radiation absorber. Examples of other suitable radiation absorbers include visible dyes, or IR dyes, or any suitable colorants having radiation absorption bands within the visible spectrum of electromagnetic radiation.

As one example, the first liquid may be an ink-type formulation including carbon black, such as, for example, the ink formulation commercially known as CM997A available from HP Inc. Within the first liquid, the carbon black may be polymerically dispersed. The carbon black pigment may also be self-dispersed within the first liquid (e.g., by chemically modifying the surface of the carbon black). Examples of inks including visible light enhancers are dye based colored ink and pigment based colored ink, such as the commercially available inks CE039A and CE042A, available from HP Inc.

Examples of suitable carbon black pigments that may be included in the first liquid include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4).

The carbon black pigment may be polymerically dispersed within the first liquid by a polymeric dispersant having a weight average molecular weight ranging from about 12,000 to about 20,000. In this example, the first liquid includes the carbon black pigment (which is not surface treated), the polymeric dispersant, and water (with or without a co-solvent). When included, an example of the co-solvent may be 2-pyrollidinone. The polymeric dispersant may be any styrene acrylate or any polyurethane having its weight average molecular weight ranging from about 12,000 to about 20,000. Some commercially available examples of the styrene acrylate polymeric dispersants are JONCRYL® 671 and JONCRYL® 683 (both available from BASF Corp.). Within the first liquid, a ratio of the carbon black pigment to the polymeric dispersant may range from about 3.0 to about 4.0. In an example, the ratio of the carbon black pigment to the polymeric dispersant is about 3.6. The polymeric dispersant may contribute to the carbon black pigment's capability for exhibiting enhanced electromagnetic radiation absorption.

The second liquid may include other colored pigments, for instance, any of yellow, cyan, magenta, or the like, colored pigments. In addition, the second liquid may include the colored pigments with similar weight percentages as those discussed above with respect to the first liquid.

In another example, the first liquid and/or the second liquid includes active material or materials, such as metal nanoparticles. In one example, the metal nanoparticles are silver (Ag), copper (Cu), or zinc (Zn). Other examples of suitable metal nanoparticles include metal alloys (where the metals are selected from, for example, Ag, Au, Cu, Ni, Rh, Ru, Mo, Ta, Ti, Pt, or Pd), metal oxide (e.g., iron oxide), metal coated oxide (e.g., iron oxide coated with Ag, Au or Pt), cadmium selenide, and metal coated silica (e.g., silica coated with Ag or Au).

The amount of the active material that is present in either or both of the first liquid and the second liquid may range from about 0 wt % to about 40 wt % based on the total wt % of the respective liquid. In other examples, the amount of the active material in the fusing agent may range from about 0.3 wt % to 30 wt %, or from about 1 wt % to about 20 wt %. Generally speaking, the active material may provide a balance between the first liquid and/or the second liquid having jetting reliability and heat and/or electromagnetic radiation absorbance efficiency.

The presence of a co-solvent, a surfactant, and/or a dispersant in either or both of the first liquid and the second liquid may assist in obtaining a particular wetting behavior with the build materials. In some instances, either or both of the first liquid and the second liquid may include water or other primary solvent, either alone or with the active material. In other instances, either or both of the first liquid and the second liquid may further include a dispersing additive, a surfactant, a co-solvent, a biocide, an anti-kogation agent, and combinations thereof.

Surfactant(s) may be used to improve the wetting properties and the jettability of either or both of the first liquid and the second liquid. Examples of suitable surfactants may include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONES fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in either or both of the first liquid and the second liquid may range from about 0.5 wt % to about 1.4 wt % based on the total wt % of the first liquid or the second liquid.

Some examples of the co-solvent (for the water-based fusing agent 26) include 1-(2-hydroxyethyl)-2-pyrollidinone, 2-Pyrrolidinone, 1,5-Pentanediol, Triethylene glycol, Tetraethylene glycol, 2-methyl-1,3-propanediol, 1,6-

Hexanediol, Tripropylene glycol methyl ether, N-methylpyrrolidone, Ethoxylated Glycerol-1 (LEG-1), and combinations thereof.

Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.). The biocide or antimicrobial may be added in any amount ranging from about 0.05 wt % to about 0.5 wt % with respect to the total wt % of the fusing agent 170.

An anti-kogation agent may be included in either or both of the first liquid 170 and the second liquid. Kogation refers to the deposit of dried ink (e.g., either or both of the first liquid and the second liquid) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in either or both of the first liquid and the second liquid may range from greater than 0.20 wt % to about 0.62 wt % based on the total wt % of the first liquid or the second liquid. In an example, the oleth-3-phosphate is included in an amount ranging from about 0.20 wt % to about 0.60 wt %, and the low molecular weight polyacrylic acid polymer is included in an amount ranging from about 0.005 wt % to about 0.015 wt %.

It is to be understood that although two liquids have been described with respect to FIG. 1B, a greater number of liquids having different fusing radiation absorbing properties with respect to each other may be selectively applied to the layer 160 of the 3D part. For instance, the 3D printer 100 may include additional delivery devices that are to deliver liquid having different colors with respect to the first and second delivery devices 130, 132. In one regard, therefore, the 3D printer 100 may form 3D parts having a single color or having multiple colors. In addition, liquids having different colors may be deposited onto common ones of the build materials 106 to created mixed colored liquids, e.g., cyan and magenta may be mixed in various quantities to form a particular blue color. In addition, or alternatively, the choice of active materials to assist in the absorption of fusing radiation, co-solvents, surfactants, dispersants, and anti-kogation agents may be deterministically optimized for specific applications and/or materials.

As another example, at least one of the liquids may be a cooling liquid that is to cool the build materials 106 with which the liquid has been mixed or upon which the liquid has been applied. For instance, the cooling liquid may be composed of any suitable liquid that may prevent the build materials 106 with which the liquid has been mixed or upon which the liquid has been deposited from fusing together during application of fusing radiation onto those build materials 106 by either or both of the first and second fusing radiation generators 134 and 136.

Figure 1C:
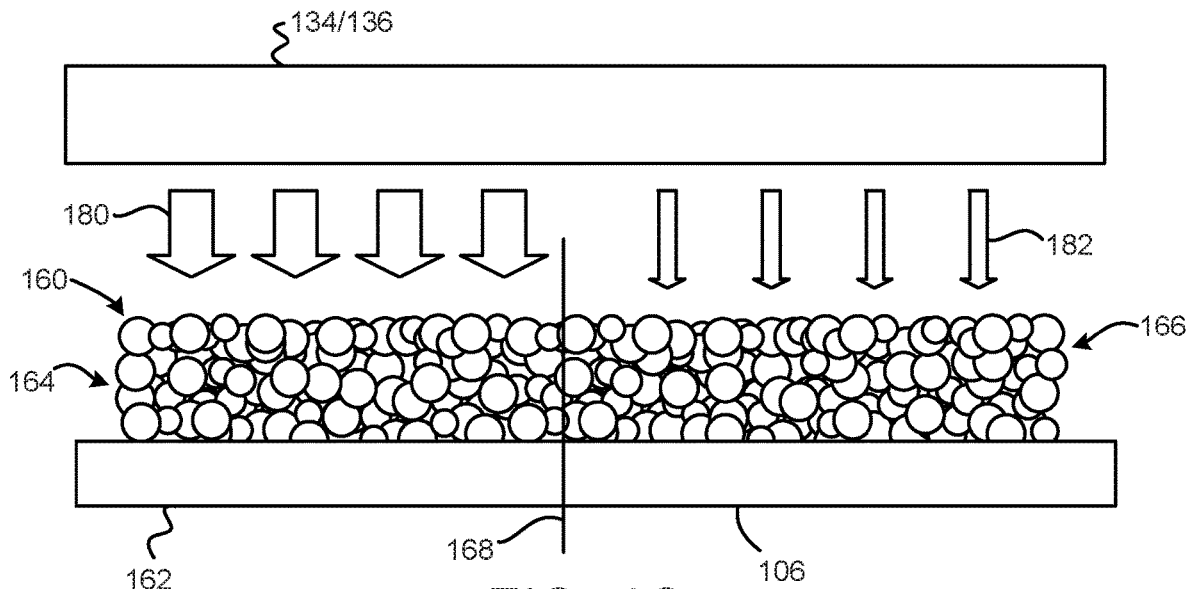
FIG. 1C shows a simplified diagram of a layer of build materials depicted in FIG. 1B during application of a first fusing radiation and a second fusing radiation from a fusing radiation generator.

Turning now to FIG. 1C, there is shown a simplified diagram of the layer 160 during application of a first fusing radiation 180 and a second fusing radiation 182 from either or both of the fusing radiation generators 134/136. The first fusing radiation 180 may be fusing radiation that the fusing radiation generator(s) 134, 136 emits at a first range of wavelengths and the second fusing radiation 182 may be fusing radiation that the fusing radiation generator(s) 134, 136 emits at a second range of wavelengths. By way of particular example, the first range of wavelengths may be a first range of wavelengths of light and the second range of wavelengths may be a second range of wavelengths of light. As shown, the first fusing radiation 180 is depicted as being applied onto the build materials 106 in the first section 164 upon which first liquid droplets 170 have been deposited. In addition, the second fusing radiation 182 is depicted as being applied onto the build materials 106 in the second section 166 upon which second liquid droplets 172 have been deposited.

As discussed above, the first liquid may have a different fusing radiation absorbing rate as compared with the second liquid. According to an example, the range of wavelengths of the fusing radiations 180, 182 applied onto the sections 164, 166 may be tuned (or equivalently, chosen) based upon the fusing radiation absorption properties of the liquids respectively deposited onto the build materials 106 contained in the sections 164, 166. For instance, the chosen range of wavelengths of the fusing radiations 180, 182 may be the range of wavelengths that may have the highest levels of interaction with the respective liquids. By way of example in which the first and second fusing radiations 180, 182 are light, the range of wavelengths of the first fusing radiation 180 may be a range of wavelengths that has the highest level of interaction with the color of the first liquid. Likewise, the range of wavelengths of the second fusing radiation 182 may be a range of wavelengths that has the highest level of interaction with the color of the second liquid. The range of wavelengths at which the fusing radiations 180, 182 may be applied may be determined through testing to determine which ranges of wavelengths have the highest levels of interaction with which colors of the liquids. In addition, the range of wavelengths tuned to particular fusing radiation absorption properties of the liquids may be stored in a data store.

In a particular example, the range of wavelengths at which the fusing radiations 180, 182 are applied may substantially be matched to the ranges of wavelengths of the respective colors of the liquids. Thus, for instance, if the first liquid has a blue color, e.g., a range of wavelengths of about 500 nm, the first fusing radiation 180 may be emitted at a range of wavelengths of around 500 nm. In one regard, by substantially matching the ranges of wavelengths at which the fusing radiations 180, 182 are applied to the fusing radiation absorption properties of the respective liquids, the build materials 106 in each of the sections 164, 166 may be fused to the build materials 106 in the respective sections 164, 166 in a relatively efficient manner. For instance, less energy may be required to fuse the build materials 106 together as compared with application of fusing radiation at ranges of wavelengths that are not substantially matched to the fusing radiation absorption properties of the respective liquids. According to an example, the ranges of wavelengths at which the fusing radiations 180, 182 may be applied may have the same or similar spectral reflectance characteristics as the colors of the liquids, which may make them a good metameric match with a low degree of metamerism. In addition, different combinations of liquids having different colors may be applied to the same build materials 106 such that the combined liquids result in a color having optimized fusing radiation absorptive properties with respect to the ranges of wavelengths at which the fusing radiations 180, 182 are applied.

Following application of the first and second fusing radiations 180, 182, the build materials 106 in the first section 164 may be fused together and the build materials 106 in the second section 166 may be fused together.

With reference now to FIG. 2A, there is shown a bottom view of a simplified block diagram of an example fusing radiation generator 200, which may be representative of the fusing radiation generators 134, 136 depicted in FIG. 1A. As shown in FIG. 2A, the fusing radiation generator 200 may include an array 202 of light sources 204-208, in which each group of three light sources 204-208 may form a pixel. That is, the array 202 may include respective groups of pixels, in which each of the pixels includes a group of three light sources 204-208. According to an example, each light source of the three light sources 204-208 may emit a different color of light. For instance, a first light source 204 may emit a red colored light, a second light source 206 may emit a green colored light, and a third light source 208 may emit a blue colored light. The three light sources 204-208 may be controlled such that the light sources 204-208 may be activated in various intensities to emit light at various colors (i.e., various ranges of wavelengths). The array 202 may, however, include pixels formed of a lesser or a greater number of light sources 204-208. In addition, by controlling which of the groups of light sources 204-208 are activated, the locations at which fusing radiation is applied onto the layer 160 of build materials 106 may also be controlled.

In a first example, the light sources 204-208 may be light emitting diodes (LEDs). In another example, the light sources 204-208 may be vertical-cavity surface-emitting layers (VCSELs). In other examples, the light sources 204-208 may be any suitable types of light sources that are able to emit light at controllable ranges of wavelengths.

With reference now to FIG. 2B, there is shown a simplified block diagram of another example fusing radiation generator 220, which may be representative of the fusing radiation generators 134, 136 depicted in FIG. 1A. As shown in FIG. 2B, the fusing radiation generator 220 may include a plurality of light sources 222-226, in which each of the light sources 222-226 may output a different colored light beam. 228-232. For instance, a first light source 222 may output a red colored light beam 228, a second light source 224 may output a green colored light beam 230, and a third light source 226 may output a blue colored light beam 232. The three light sources 222-226 may be controlled such that the light sources 222-226 may be activated in various intensities to emit light beams at various colors (i.e., various ranges of wavelengths). Although three light sources 222-226 have been depicted in FIG. 2B, it should be understood that the fusing radiation generator 220 may include any suitable number of light sources to generate any suitable number of light beams having different ranges of wavelengths with respect to each other.

The fusing radiation generator 220 is also depicted as including optics 240 that may include either or both of lenses and mirrors that are positioned to direct the light beams 228-232 to a digital micromirror device 250. The digital micromirror device 250 may be composed of a plurality of microelectromechanical devices (not shown) having mirrored surfaces such that the microelectromechanical devices may direct light impinging on the mirrored surfaces to various locations on a layer 160 of the build materials 106. That is, for instance, the angles at which the microelectromechanical devices are positioned may be varied to vary the locations upon which the light beams 228-232 outputted from the light sources 222-226 are directed. By varying the intensities of the outputs of the light sources 222-226 and the positions of the microelectromechanical devices, both the ranges of wavelengths of the light and the locations upon which the light is directed may be controlled.

Although not shown, the fusing radiation generator 220 may include additional sets of light sources 222-226, optics 240, and digital micromirror devices 250 to enable light beams to be directed to multiple locations on the layer 160 concurrently.

Figure 3:
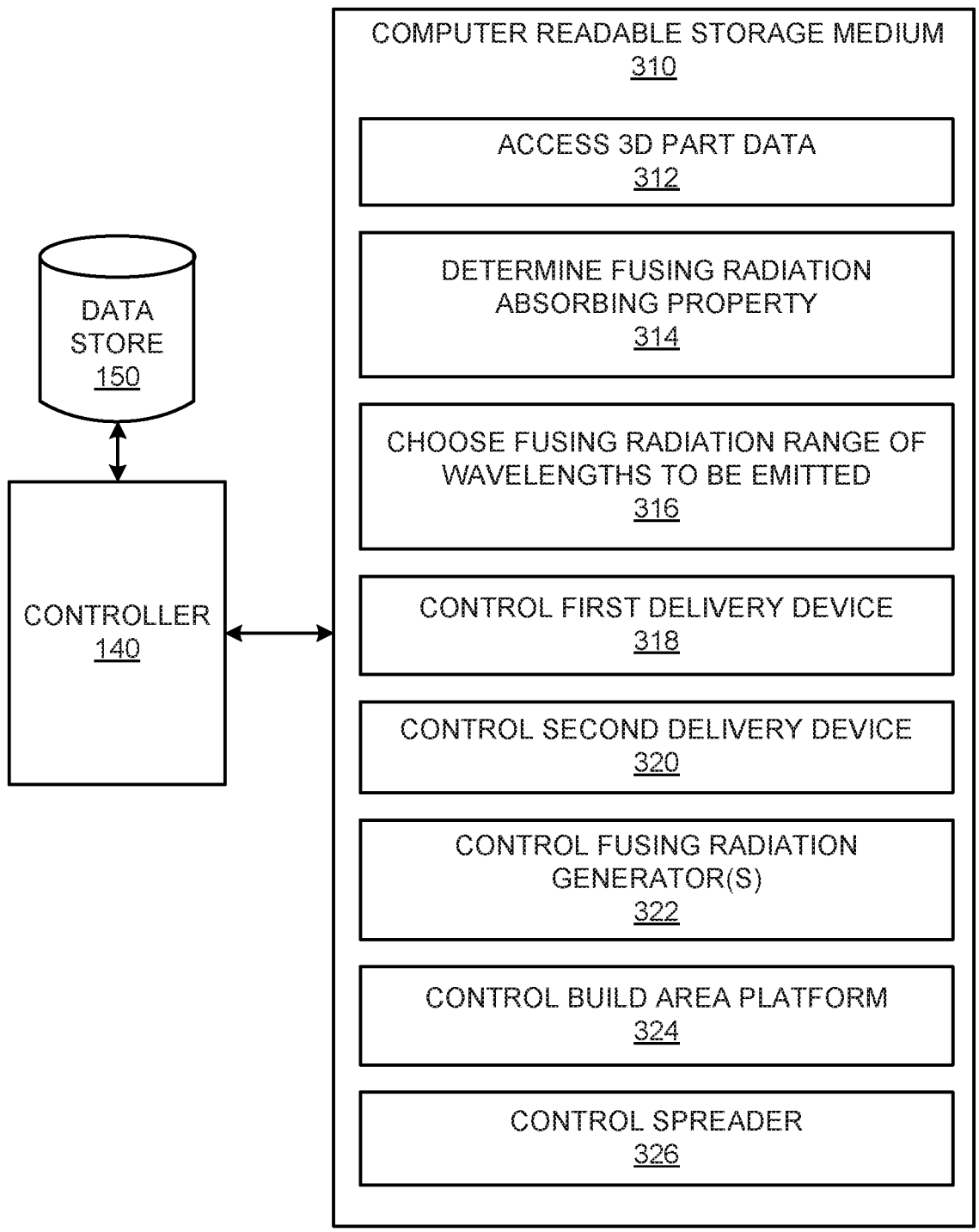
FIG. 3 depicts a block diagram of an example management apparatus that may be implemented in the 3D printer depicted in FIG. 1A.

Turning now to FIG. 3, there is shown a simplified block diagram of an example management apparatus 300 that may be implemented in the 3D printer depicted in FIG. 1A. In one example, the management apparatus 300 may form part of the 3D printer 100 depicted in FIG. 1A. For instance, the management apparatus 300 may be a command module or other control system of the 3D printer 100. It should be understood that the management apparatus 300 depicted in FIG. 3 may include additional components, and that some of the components described herein may be removed and/or modified without departing from a scope of the management apparatus 300 disclosed herein.

The management apparatus 300 depicted in FIG. 3 is shown as including a controller 140 and a data store 150, which may be the same as the controller 140 and data store 150 depicted in and described above with respect to FIG. 1A. As such, the controller 140 and the data store 150 depicted in FIG. 3 are not described in detail and instead, the descriptions of the controller 140 and the data store 150 provided above with respect to the 3D printer 100 are intended to also describe these components with respect to the management apparatus 300.

As shown in FIG. 3, the management apparatus 300 may include a computer readable storage medium 310 on which is stored machine readable instructions 312-326 (which may also be termed computer readable instructions) that the controller 140 may execute. More particularly, the controller 140 may fetch, decode, and execute the instructions 312-326 to access data pertaining to a 3D part to be printed 312, determine a fusing radiation absorbing property of a liquid to be deposited 314, tune a range of wavelengths of fusing radiation to be emitted 316, control a first delivery device to deliver a first liquid 318, control a second delivery device to deliver a second liquid 320, control a fusing radiation generator(s) to apply fusing radiation at a tuned range of wavelengths(s) 322, control a build area platform 324, and control a recoater 326. As an alternative or in addition to retrieving and executing instructions, the controller 140 may include one or more electronic circuits that include components for performing the functionalities of the instructions 312-326. In any regard, and as discussed above, the controller 140 may communicate instruction signals to the various components of the 3D printer 100 via communication lines such that the components may operate in the manners described herein.

The computer readable storage medium 310 may be any electronic, magnetic, optical, or other physical storage device that contains or stores executable instructions. Thus, the computer readable storage medium 310 may be, for example, Random Access Memory (RAM), an Electrically Erasable Programmable Read-Only Memory (EEPROM), a storage device, an optical disc, and the like. The computer readable storage medium 310 may be a non-transitory machine-readable storage medium, where the term "non-transitory" does not encompass transitory propagating signals.

Figure 4:
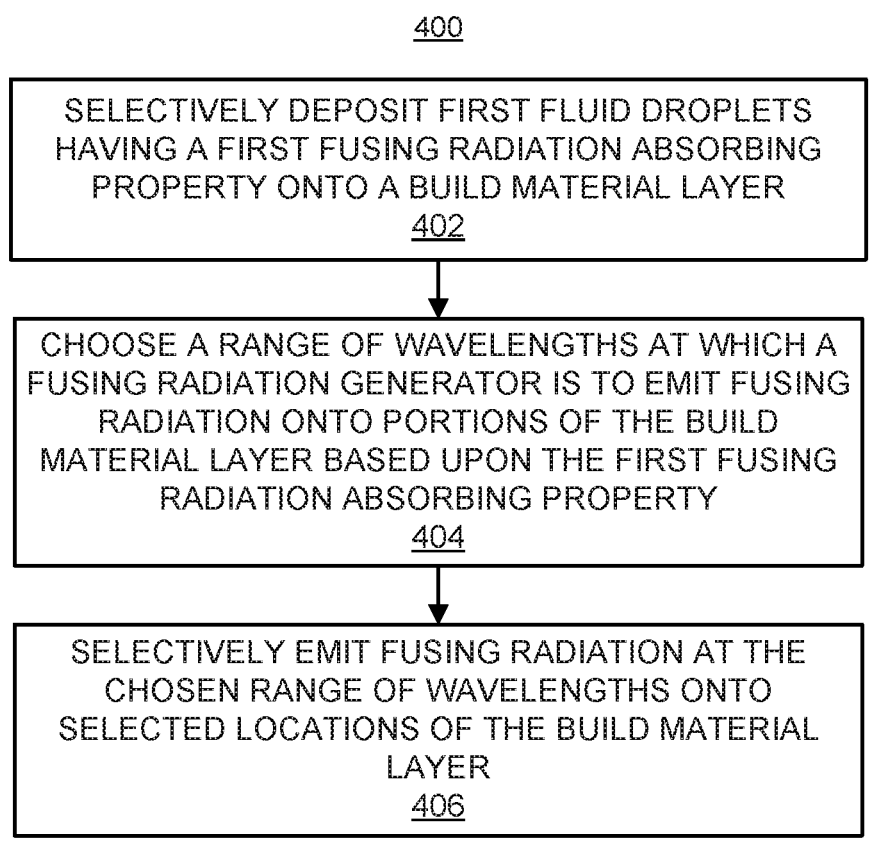
FIGS. 4 and 5, respectively, depict example methods for selectively fusing build materials upon which liquid has been selectively deposited.
Figure 5:
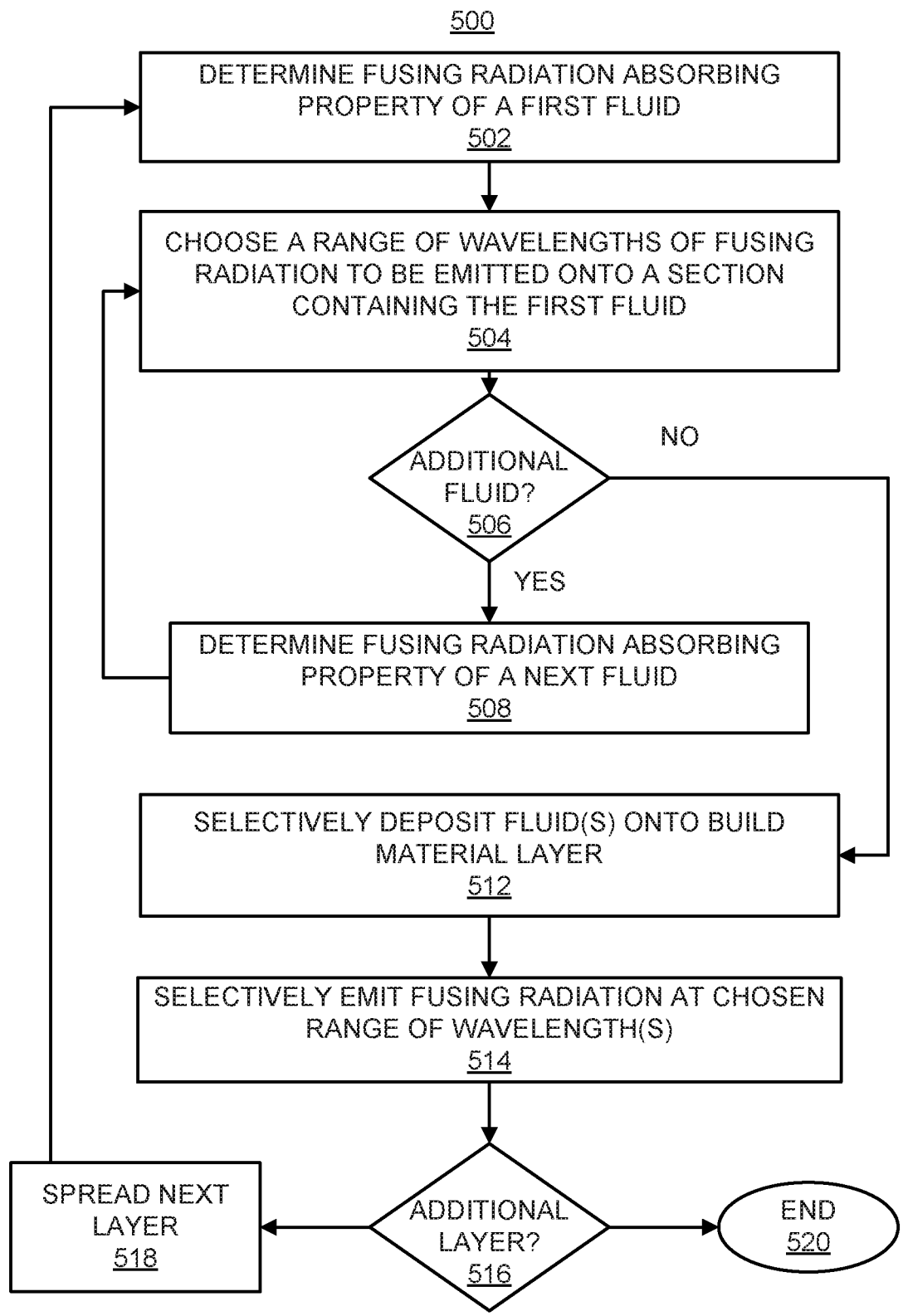

Various manners in which the management apparatus 300 may be implemented are discussed in greater detail with respect to the methods 400 and 500 respectively depicted in FIGS. 4 and 5. Particularly, FIGS. 4 and 5, respectively, depict example methods 400 and 500 for selectively fusing build materials 106 upon which liquid has been selectively deposited. It should be apparent to those of ordinary skill in the art that the methods 400 and 500 may represent generalized illustrations and that other operations may be added or existing operations may be removed, modified, or rearranged without departing from the scopes of the methods 400 and 500.

The descriptions of the methods 400 and 500 are made with reference to the 3D printer 100 illustrated in FIG. 1A and the management apparatus 300 illustrated in FIG. 3 for purposes of illustration. It should, however, be understood that 3D printers and management apparatuses having other configurations may be implemented to perform either or both of the methods 400 and 500 without departing from the scopes of the methods 400 and 500.

Prior to execution of the method 400 or as part of the method 400, the controller 140 may execute instructions 312 stored on the machine-readable medium 310 to access data pertaining to a 3D part that is to be printed. By way of example, the controller 140 may access data stored in the data store 150 pertaining to a 3D part that is to be printed. The controller 140 may determine the number of layers of build materials 106 that are to be formed and the locations at which first liquid is—or multiple liquids 170, 172 are—to be deposited by the first delivery device 130 on each of the respective layers of build materials 106 in order to print the 3D part. The controller 140 may further determine the range of wavelengths at which fusing radiation is to be supplied onto different locations of each of the layers by the fusing radiation generator(s) 134, 136.

With reference first to FIG. 4, at block 402, first liquid droplets 170 having a first fusing radiation absorbing property may be selectively deposited onto a build material layer 160. For instance, the controller 140 may execute the instructions 318 to control the first delivery device 130 to deposit the first liquid droplets 170 onto a first section 164 of the build material layer 160 as shown in FIG. 1B. By way of example, the controller 140 may control the first delivery device 130 to deposit the first liquid droplets 170 onto sections of the build material layer 160 that are to form part of the 3D part. In another example, the controller 140 may control the first delivery device 130 to deposit the first liquid 170 onto sections of the build material layer 160 that are not to form part of the 3D part.

At block 404, a controller 140 may tune a range of wavelengths at which a fusing radiation generator(s) 134, 136 is to emit fusing radiation onto portions of the build material layer 160 based upon the first fusing radiation absorbing property. For instance, the controller 140 may execute the instructions 316 to choose the range of wavelengths to be a range of wavelengths that is to cause the fusing radiation to have a higher level of interaction with the first liquid as compared with other ranges of wavelengths. By way of example, the chosen range of wavelengths may be a range of wavelengths that has been determined through testing as maximizing absorption of the fusing radiation by the first liquid. In this example, the chosen range of wavelengths may be a range of wavelengths that substantially matches the range of wavelengths (e.g., color) of the first liquid.

In another example, however, the chosen range of wavelengths may be a range of wavelengths that has been determined through testing as minimizing absorption of the fusing radiation by the first liquid. In this example, the chosen range of wavelengths may be a range of wavelengths that is substantially different from the range of wavelengths (e.g., color) of the first liquid 170. For instance, the chosen range of wavelengths may be outside of the range of wavelengths at which absorption of the fusing radiation by the first liquid is maximized.

At block 406, fusing radiation may be emitted selectively at the chosen range of wavelengths onto selected locations of the build material layer 160. For instance, the controller 140 may execute the instructions 322 to control the fusing radiation generator(s) 134 to emit fusing radiation at the chosen range of wavelengths. In addition, the controller 140 may control the fusing radiation generator(s) 134 to emit the fusing radiation at the chosen range of wavelengths onto selected locations of the build material layer 160. By way of example, the controller 140 may control the fusing radiation generator(s) 134, 136 to emit light at the chosen range of wavelengths onto sections of the build material layer 160 upon which the first liquid droplets 170 have been deposited. In this regard, the controller 140 may prevent or minimize application of fusing radiation at the chosen range of wavelengths onto sections of the build material layer 160 upon which the first liquid droplets 170 have not been deposited.

With reference now to FIG. 5, at block 502, a fusing radiation absorption property of a first liquid that is to be delivered onto a build material layer 160 may be determined. That is, the controller 140 may execute the instructions 314 to determine the fusing radiation absorbing property of the first liquid. For instance, the controller 140 may determine the color of the first liquid, the range of wavelengths of fusing radiation at which the absorption of the fusing radiation by the first liquid may be maximized, the range of wavelengths of fusing radiation at which the absorption of the fusing radiation by the first liquid may be minimized, or the like. The controller 140 may make this determination through accessing information pertaining to the first liquid that may be stored in the data store 150, information that may be accessible via a network, information that may be inputted by a user, or the like.

At block 504, the range of wavelengths of the fusing radiation to be emitted onto sections of the build material layer 160 upon which the first liquid is to be deposited may be chosen based upon the determined fusing radiation absorption property of the first liquid 170. For instance, the controller 140 may execute the instructions 316 to choose the range of wavelengths at which the fusing radiation is to be emitted to be the range of wavelengths that is to result in a maximized level of interaction with the first liquid 170 as determined at block 502. According to an example, the range of wavelengths of the energy to be emitted may have been previously determined and may be stored in the data store 150, for instance, in the form of a lookup table.

At block 506, the controller 140 may determine whether an additional liquid is to be deposited onto the build material layer 160. That is, the controller 140 may determine, for instance, from the accessed 3D part data, whether the additional liquid is to be deposited onto the build material layer 160. For instance, the controller 140 may determine that the additional liquid is to be deposited if the layer 160 is to include multiple colors or and/or if the layer 160 is to have a mixed color. As discussed above, the additional liquid may have different fusing radiation absorbing properties as compared with the first liquid.

In response to a determination that an additional liquid is to be deposited, the controller 140 may determine a fusing radiation absorbing property of the additional (next) liquid, as indicated at block 508. In addition, the controller 140 may choose a range of wavelengths of the fusing radiation to be emitted onto sections of the layer 160 upon which the additional liquid is to be delivered, as indicated at block 504. Blocks 504-508 may be repeated for any additional liquids that are to be deposited onto the layer 160.

Following the "no" condition at block 506, the first liquid droplets 170 or droplets of multiple liquids 170, 172 may be selectively deposited onto the build material layer 160, as indicated at block 512. For instance, the controller 140 may execute the instructions 318 and/or 320 to cause either or both of the first delivery device 130 and the second delivery device 132 to selectively deposit the liquid droplets 170 or the droplets of multiple liquids 170, 172 onto selected locations of the build material layer 160. For instance, the controller 140 may cause either or both of the first delivery device 130 and the second delivery device 132 to selectively deposit the first liquid droplets 170 or the droplets of multiple liquids 170, 172 onto the locations of the layer 160 that are to be fused together and to have any color of preselected colors.

At block 514, fusing radiation may selectively be emitted at the chosen range or ranges of wavelengths. For instance, the controller 140 may execute the instructions 322 to control the fusing radiation generator(s) 134, 136 to emit the fusing radiation at the chosen range or ranges of wavelengths as the fusing radiation generators 134 is scanned across the layer 160. In addition, the controller 140 may control the fusing radiation generator(s) 134, 136 to emit the fusing radiation at the chosen range or ranges of wavelengths at selected locations on the layer 160. For instance, the controller 140 may control the fusing radiation generator(s) 134, 136 to emit the fusing radiation at a chosen range of wavelengths (or bandgap) onto sections of the layer 160 upon which the first liquid droplets 170 have been deposited. The controller 140 may also control the fusing radiation generator(s) 134, 136 to emit the fusing radiation at a second chosen range of wavelengths (or bandgap) onto other sections of the layer 160 upon which second liquid droplets 172 have been deposited.

Following block 514, the build materials 106 contained in the sections of the layer 160 upon which the liquid droplets 170 or droplets of liquids 170, 172 have been deposited and upon which the fusing radiation has been applied, may be at least partially fused together.

At block 516, the controller 140 may determine whether an additional layer 160 is to be formed, for instance, based upon accessed information regarding the 3D part to be printed. In response to a determination that an additional layer 160 is to be formed, a next layer of build materials 106 may be spread on top of the previous layer 160, as indicated at block 518. For instance, the controller 140 may execute the instructions 324 to control the build area platform 102 to be moved downward and may execute the instructions 326 to control the recoater 108 to spread build materials 106 across the previous layer 160. In addition, blocks 502-518 may be repeated until no additional layers are to be formed, at which point the method 500 may end, as indicated at block 520.

Some or all of the operations set forth in the methods 400 and 500 may be contained as utilities, programs, or subprograms, in any desired computer accessible medium. In addition, the methods 400 and 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A three-dimensional (3D) printer comprising:
   a first delivery device to deposit a first liquid onto a first section of a build material layer, wherein the first liquid has a first fusing radiation absorbing property;
   a second delivery device to deposit a second liquid onto a second section of the build material layer, wherein the second liquid has a second fusing radiation absorbing property;
   a fusing radiation generator to emit a first fusing radiation at a first range of wavelengths onto the first section of the build material layer to fuse build materials in the first section and emit a second fusing radiation at a second range of wavelengths onto the second section of the build material layer to fuse build materials in the second section; and
   a controller to:
      select the first range of wavelengths of the first fusing radiation for the fusing radiation generator to emit based on the first fusing radiation absorbing property of the first liquid;
      select the second range of wavelengths of the second fusing radiation for the fusing radiation generator to emit based on the second fusing radiation absorbing property of the second liquid; and
      control the fusing radiation generator to emit the first fusing radiation at the first range of wavelengths onto the first section of the build material layer, and emit the second fusing radiation at the second range of wavelengths onto the second section of the build material layer.

2. The 3D printer according to claim 1, wherein the first range of wavelengths is a range of wavelengths that is identified to enhance a fusing radiation absorbing rate of the first fusing radiation by the build materials upon which the first liquid has been deposited.

3. The 3D printer according to claim 1, wherein the first fusing radiation absorbing property of the first liquid is dependent upon a color of the first liquid and wherein the controller is to select the first range of wavelengths to be a same range of wavelengths as the color of the first liquid.

4. The 3D printer according to claim 1, wherein the controller is to select the first range of wavelengths of the first fusing radiation to be a range of wavelengths that is identified to reduce absorption of the first fusing radiation by the first liquid.

5. The 3D printer according to claim 1, wherein the controller is to:
vary angles of mirrored surfaces in the fusing radiation generator to vary locations on the build material layer upon which light beams generated from the fusing radiation generator are directed.

6. The 3D printer according to claim 1, wherein the fusing radiation generator comprises a plurality of light emitting diodes arranged in an array, wherein each of the plurality of light emitting diodes is to emit one of a plurality of different colors of light.

7. The 3D printer according to claim 1, wherein the fusing radiation generator comprises a plurality of mirrors to direct light emitted from a plurality of colored light sources onto the first and second sections of the build material layer.

8. The 3D printer according to claim 1, further comprising:
a carriage, wherein the fusing radiation generator is supported on the carriage and wherein the controller is to control the carriage to be moved across the build material layer while the fusing radiation generator emits the first fusing radiation at the first range of wavelengths to the first section.

9. A method comprising:
depositing, by a first delivery device of a three-dimensional (3D) printer, a first liquid having a first fusing radiation absorption property onto a first section of a build material layer;
depositing, by a second delivery device of the 3D printer, a second liquid having a second fusing radiation absorption property onto a second section of the build material layer;
determining, by a controller of the 3D printer, an amount of fusing radiation for a fusing radiation generator to generate to fuse build materials in each section of the build material layer, including selecting a first range of wavelengths of a first fusing radiation for the fusing radiation generator to emit based on the first fusing radiation absorption property of the first liquid and selecting a second range of wavelengths of a second fusing radiation for the fusing radiation generator to emit based on the second fusing radiation absorption property of the second liquid; and
causing, by the controller, the fusing radiation generator to emit the first fusing radiation at the first range of wavelengths onto the first section of the build material layer to fuse build materials in the first section, and emit the second fusing radiation at the second range of wavelengths onto the second section of the build material layer to fuse build materials in the second section.

10. The method according to claim 9, wherein choosing the first range of wavelengths is a range of wavelengths that is identified to enhance absorption of the first fusing radiation by the first liquid.

11. The method according to claim 9, wherein the first fusing radiation absorbing property is dependent upon a color of the first liquid and wherein the first range of wavelengths of the first fusing radiation has a same range of wavelengths as the color of the first liquid.

12. The method according to claim 9, further comprising:
identifying a location of the first section and a location of the second section of the build material layer; and
controlling angles of mirrored surfaces in the fusing radiation generator to direct light beams emitted from the fusing radiation generator to the location of the first section and to the location of the second section of the build material layer.

13. The method according to claim 9, wherein the first range of wavelengths of the first fusing radiation comprises is a range of wavelengths that is identified to reduce absorption of the first fusing radiation by the first liquid.

14. A non-transitory computer readable medium on which is stored machine readable instructions that when executed by a processor of a three-dimensional (3D) printer, cause the processor to:
instruct a first delivery device to deposit a first liquid having a first fusing radiation absorbing property onto a first section of a build material layer;
instruct a second delivery device to deposit a second liquid having a second fusing radiation absorbing property onto a second section of the build material layer;
determine an amount of fusing radiation for a fusing radiation generator to emit to fuse build materials in each section of the build material layer, including instructions that cause the processor to: select a first range of wavelengths of a first fusing radiation for the fusing radiation generator to emit based on the first fusing radiation absorbing property of the first liquid and select a second range of wavelengths of a second fusing radiation for the fusing radiation generator to emit based on the second fusing radiation absorbing property of the second liquid; and
instruct the fusing radiation generator to emit the first fusing radiation at the first range of wavelengths onto the first section of the build material layer and emit the second fusing radiation at the second range of wavelengths onto the second section of the build material layer.

15. The non-transitory computer readable medium according to claim 14, wherein the first range of wavelengths of the first fusing radiation is selected to enhance absorption of the first fusing radiation by the first liquid.

* * * * *